May 12, 1931.  F. L. VANATTA  1,805,426
CHALK LINE SPOOL
Filed June 20, 1929
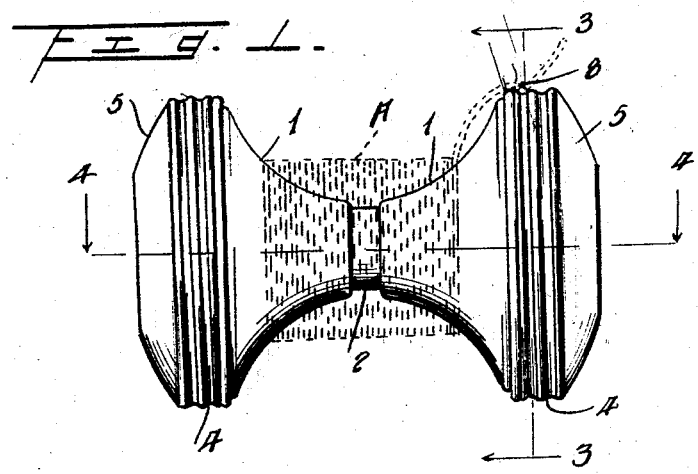
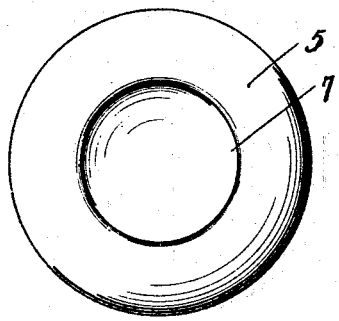
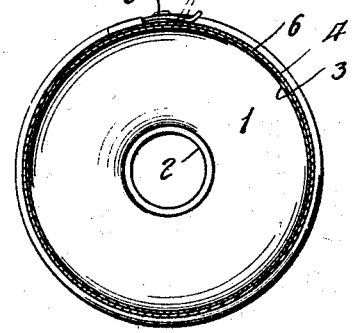
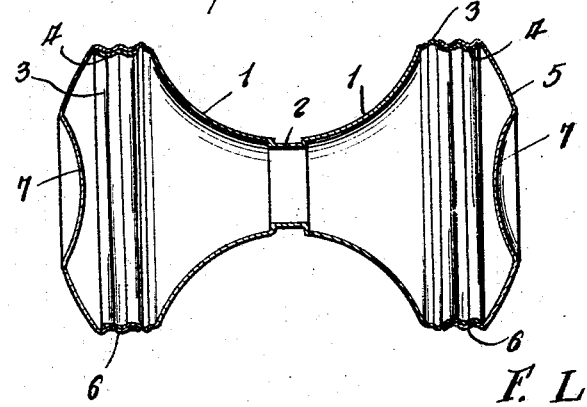
Inventor
F. L. Vanatta,
By
Attorney Patented May 12, 1931

1,805,426

UNITED STATES PATENT OFFICE

FRED L. VANATTA, OF ORLAND, INDIANA

CHALK LINE SPOOL

Application filed June 20, 1929. Serial No. 372,462.

The invention relates to a spool for holding chalk lines and the like and has for its object the provision of an improved spool made preferably of sheet metal and hollow and having its ends closed by threaded caps thus forming receptacles in the ends of the spool that may be utilized for containing cakes of chalk to be used on the line. The spool also carries a spring clip that may be used to engage the end of the thread when wound on the spool to prevent unwinding, and may also be used to clip the line when the proper length is taken off of the spool to be used for marking and would thus prevent unwinding of the spool should it be accidentally dropped while the chalk line is in use.

The construction and operation and advantages of the device will be described in detail hereinafter and will be found illustrated in the accompanying drawings in which Figure 1 is a side view in elevation of the improved chalk line spool showing the line wrapped thereon in broken lines, Figure 2, an end view, Figure 3, a transverse sectional view on a plane indicated by the line 3—3 of Figure 1, and Figure 4, a longitudinal sectional view on the plane indicated by the line 4—4 of Figure 1.

In the drawings, similar reference characters will be used to designate corresponding parts throughout the several views.

The improved chalk line spool is, as above stated, preferably made of metal and is formed hollow having two conoidal ends designated 1 having their smaller ends joined by an integral band 2 of less diameter than the adjacent ends of the parts 1, said band 2 being designed to receive one end of the chalk line A that may be tied on the reduced band 2.

The extremities of the spool are cylindrical as shown at 3 and formed with screw threads 4. The ends of the spool are closed by means of caps 5 having flanges 6 that are also formed with threads to engage the threads 4 of the cylindrical ends 3 of the spool. The ends of the cap 5 are convexed as shown adjacent to the flanges 6 and have their middle portions pressed inwardly to form a recess 7. The recesses 7 are to receive the thumb and finger of the operator's hand to provide a journal for the rotation of the spool in unwinding the line A and in rewinding it thereon.

A spring clip 8 is secured to the flange 6 of one of the caps 5 and as shown in Figures 1 and 3, clip 8 is designed to secure the line to prevent unwinding from the spool. As hereinbefore stated the clip 8 may be used to engage the end of the line when wound on the spool, or after a sufficient length of line has been unwound from the spool for the use to which it is to be put the line may be engaged under the clip 8 so that should the spool be casually dropped, the line will not be further unwound from the spool.

The recesses formed in the ends of the spool by the conoidal portions 1 and flanges 3 and the caps 5 provide receptacles in which may be kept pieces of chalk and other small articles that may be used by the operator. It will be apparent that by having the receptacles in the spool for the chalk a great advantage is attained and furthermore economy in storage and in transportation is attained.

What is claimed is:—

1. A chalk line spool having a hollow body portion provided with threaded extremities, threaded caps adapted to engage said threaded extremities, each of said caps having an inwardly bulged portion to receive a thumb and finger in unwinding the spool, and a spring clip secured to one of said caps and adapted to engage a chalk line.

2. A chalk line spool having a hollow body portion of double conoidal form, the extremities of the body portion being cylindrical and provided with screw threads, caps for said extremities having threaded flanges to engage said threaded cylindrical extremities, each of said caps having an inwardly bulged portion to receive a thumb and finger in unwinding the spool, and a spring clip secured to one of said caps adapted to engage a chalk line.

In testimony whereof I affix my signature.

FRED L. VANATTA.